Sept. 4, 1951  G. A. MILLS  2,566,353
PURIFICATION OF OILS
Filed Aug. 4, 1948
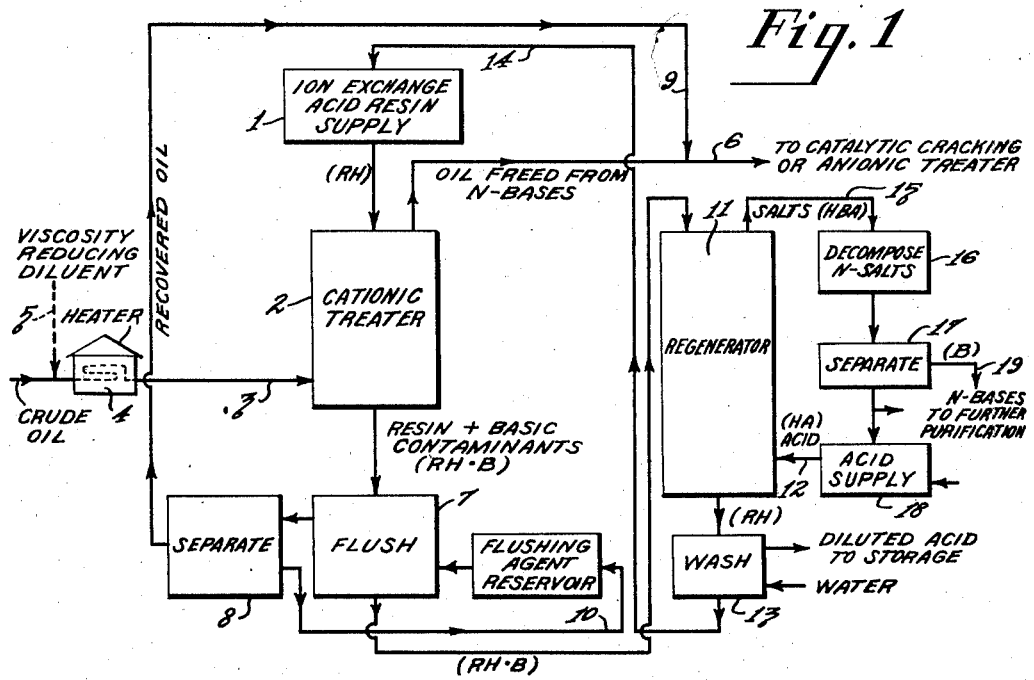
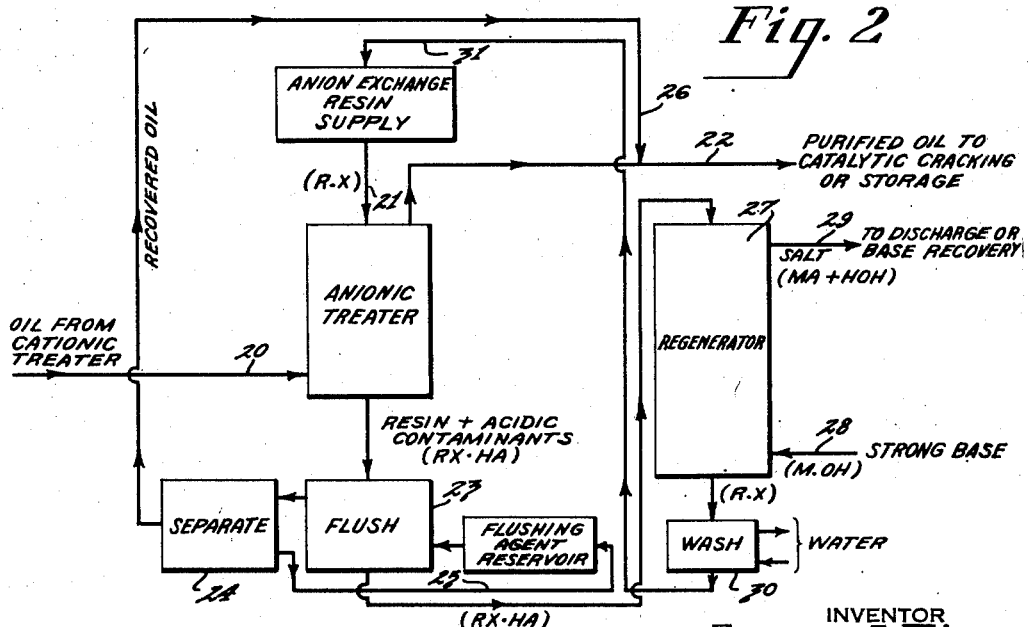
INVENTOR
GEORGE A. MILLS
BY
ATTORNEY Patented Sept. 4, 1951

2,566,353

UNITED STATES PATENT OFFICE 2,566,353

PURIFICATION OF OILS

George Alexander Mills, Swarthmore, Pa., assignor to Houdry Process Corporation, Wilmington, Del., a corporation of Delaware Application August 4, 1948, Serial No. 42,391

7 Claims. (Cl. 260—283)

The present invention relates to refining and purification of oils and crude hydrocarbon materials. An important aspect of the invention is the treatment of liquid hydrocarbon materials such as whole or reduced crude petroleum oils, shale oils, coal tar oils, etc. or distilled fractions thereof, in the preparation of stocks to be charged to a catalytic conversion operation such as cracking.

By the methods of the present invention there can be separated and removed from whole or reduced hydrocarbon crudes or fractions thereof certain deleterious non-hydrocarbon components and contaminants, such as basic nitrogen compounds or other nitrogen compounds which become converted to deleterious nitrogen bases during further processing or use at elevated temperatures.

These nitrogen compounds when present even in relatively small amounts as of the order of 1% or less in hydrocarbon charge stocks subjected to catalytic cracking, act either as transitory "poisons" or deactivants for the catalyst and/or demonstrate an inhibitory effect on the cracking reactions, resulting in reduced yields of desired conversion products, such as gasoline. The presence of these nitrogenous compounds in oil fractions or distillates which are not employed as cracking stocks also may be detrimental for certain uses; for instance in oils to be used as lubricants, fuel oils, medicinal oils, transformer oils, etc.

It has previously been proposed to remove these deleterious products by treatment with strong mineral acids or aqueous solutions thereof, but in doing so other reactive and non-detrimental constituents of the oil are also removed thereby, with consequent loss of valuable and desirable products from the oil as well as increasing the acid requirements.

I have discovered that these deleterious nitrogen compounds can efficiently be removed or reduced to materially less deleterious concentrations by contacting the oil under certain conditions hereinafter set forth, with organic cation-exchangers such as organolite resins having base-exchange or base-binding properties. The basic nitrogenous compounds are selectively taken up by these resins apparently forming salt-like addition compounds therewith. The resins can then be regenerated or reactivated by acid treatment or by otherwise removing these addition compounds by volatilization, chemical modification or desorption, restoring the resin to active form for reuse in the process.

Coming into consideration for use in the described process are any of the known or commercially available acidic resins having ion-exchange properties; these resins being used generally in the form of sulfonic or carboxylic acids or their salts such as the alkali and alkali-earth metal salts. It has been found, however, that more rapid and more efficient removal of nitrogen bases from oils is obtained with organic exchangers containing sulfonic groups and with these in their acid form. Accordingly, it is preferred to employ natural or synthetic sulfonated resinous materials, such as those derived from phenolic type resins, including resinous condensation products with aldehydes of mono and/or polyhydric phenols, for example phenol-formaldehyde and resorcin-formaldehyde and these or other aldehydes with substituted phenols such as nitrophenols; sulfonated tannin-formaldehyde resins, sulfonated polystyrene resins, sulfonated high molecular weight natural hydrocarbonaceous products such as sulfonated coal. Among the commercially known resins that may be employed there may be mentioned Amberlite IR-100, Amberlite IR-120, Amberlite IR-105 (sulfonated phenolic resins), Zeo-Karb (a sulfonated coal product), Nalcite HRC and Dowex-50 (polystyrene sulfonates).

These sulfonated resins are essentially gelled materials having a sponge-like structure. On drying, as at temperature of about 105° C., the structure of the resin collapses and the porosity is materially affected, resulting in considerable depreciation of the efficiency and capacity of the resin for ion exchange. Accordingly it is highly advantageous and often essential that the porosity of the resin be maintained during contact of the oils therewith. For this purpose, water is left in or added to the resin to maintain the pore structure. To obtain a fully swelled structure about 35% or more water may be required, but advantages of the presence of water are already realized when as low as 1% water is in the resin. Such water may be added to the resin prior to contact with the oil or simultaneously therewith. The presence of excess water beyond that required to swell the resin or maintain the pore structure is of no serious consequence.

Contacting of the oils with the carbonaceous exchange resin may be operated simply as a batch process, the oil being flowed through a column or over a fixed bed of resin until the efficiency or base exchange capacity of the resin is depreciated to a predetermined extent; at which time flow of oil will be discontinued, and the resin subjected to reactivation or regeneration. The restoration of the resin for further use in the process may be accomplished by treating the resin with an acid, which may be a mineral acid such as hydrochloric or sulfuric or an organic aliphatic carboxylic acid of moderate strength such as acetic or formic. The acid may be employed in anhydrous form as such or in solution in organic solvents such as hydrocarbon solvents. Preferably, however, the acids are employed in aqueous solution. Alternatively, the used resin may be restored by treatment with a strong base such as an alkali metal hydroxide, thereby exchanging the organic nitrogen substituent by the alkali metal cation, and then treating the formed alkali metal salt of the resin acid with a mineral acid or moderately strong organic acid, to regenerate the resin acid, separating the soluble salt formed by filtration, preferably accompanied by water washing. With certain nitrogenous materials which are fairly volatile or form comparatively low boiling mixtures with water, treatment of the contaminated resin with steam will be effective in restoring the resin for reuse.

The alternate use of the resin in purifying oils and reactivation or regenerating of the resin can be carried out without interruption of the process by providing two or more treating vessels containing beds of resin operated in parallel, so that after the oil has been permitted to flow over the resin in one vessel to desired extent, the flow of oil is diverted to another vessel while the resin in the first vessel is being subjected to regeneration or reactivation.

The process can be operated as a moving bed cyclic system, similar to that employed in moving catalyst in hydrocarbon conversion systems, wherein the resin moves or is moved continuously in cycle through separate zones or treating vessels, and is subjected thereby alternately to contact with contaminated oil and then to reactivation or regeneration treatment.

In contacting the oils with base exchange resins not only are nitrogenous bases removed, but other undesired contaminants may likewise be removed from the oil, such as metal compounds present, particularly nickel and vanadium.

Before subjecting the used resin to reactivation or regeneration by acid, it is preferred to remove absorbed and adherent oil therefrom by flushing with a solvent such as a light liquid hydrocarbon (f. i. pentane), and also before further use of the reactivated resin in an oil contacting operation it is desirable to remove excess acid by water washing or solvent treatment. In treatment of the nitrogen base-containing resin with certain acids, salts of the base are formed which can be decomposed by heating and the acid thereby recovered for reuse. This manner of acid recovery applies for instance in the case of formic acid, the salts of which can be readily split at moderate temperature. With more stable salts, such as sulfates or chlorides, reaction with alkali earth metal may be required. These processes are illustrated by the following equations.

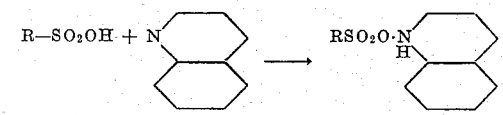

(a) With formic acid:

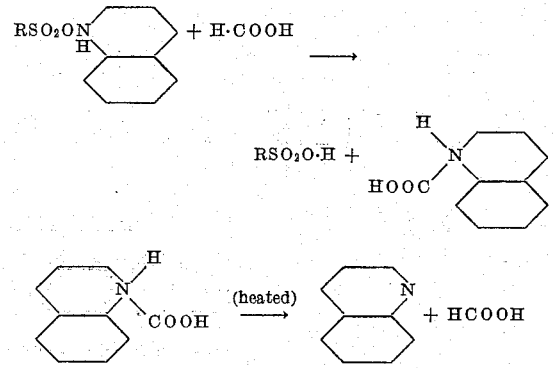

(b) With sulfuric acid:

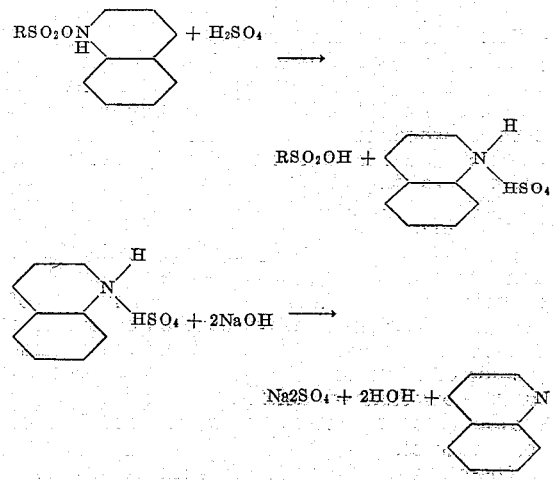

The contacting operation is preferably conducted with the oil in liquid phase and for most oils can be carried out at ordinary or room temperatures. Elevation of temperature will accelerate the rate of reaction to some extent. High temperatures having an adverse effect on the physical or chemical properties of the particular resin employed must of course be avoided. With highly viscous oils, elevation of temperature to reduce viscosity will be found beneficial. The viscosity of the oil may also be reduced by dilution with compatible and easily separable (as by distillation) light liquid hydrocarbons, such as pentane, benzene, solvent naphtha, or gasoline.

Sufficient time of contact between the oil and the resin should be provided to assure the desired extent of removal of the deleterious impurities. The required time will also depend upon temperature of the contacting, the activity of the particular resin, the viscosity of the oil, the quantity and nature of the contaminants, etc.

In addition to subjecting the oil to contact with a base-exchange resin, it is often desirable to further treat the oil with an anion-exchange resin to remove additional impurities therefrom of the kind which are taken up by the anion-exchanger. For this purpose any of the known anion-exchange resins may be employed, such as the amino resins, including quaternary amines. Commercially available resins that may be employed include Amberlite IR-3, Amberlite IR-4. The anion-exchange resins are reactivated or regenerated by treatment with ammonia or with inorganic bases such as NaOH, $Na_2CO_3$ or the corresponding potassium or other alkali metal bases. Contact of the oil with the anion-exchange resin should preferably follow that with the base-exchange resin. The conditions of the treatment with the anion-exchange resin in general may be the same as that already set out for the base-exchange resin.

A complete continuous process of treating a reduced crude oil with both types of resin and the reactivation of the resin is illustrated in the accompanying flow diagram. It will be understood that certain of the steps shown in the drawing are optional and should not be construed as a limitation of the invention. Figure 1 of the accompanying drawing is a flow diagram illustrating the treatment of the oil with acidic resins to remove nitrogen bases and other basic contaminants; Figure 2 is a similar diagram illustrating the treatment of oil with anion-exchange resins which may be applied to the oil recovered from the preceding treatment as a continuous operation.

The reference characters hereinafter noted designate correspondingly numbered positions or steps on the flow charts.

As shown in Figure 1, the acidic resin (RH) from a suitable source of supply 1 is passed continuously, advantageously by gravity, to a cationic treater 2 and the crude oil to be purified is introduced 3 in liquid state into contact with a moving bed of the resin in the treater. The efficiency of the treatment is enhanced by conducting the contacting operation countercurrently so that the oil being discharged from the treater contacts the freshly regenerated and more active resin. The viscosity of the oil, before introduction into the treater, may be reduced by passing the same through a suitable heater 4 and also, if desired, by admixing therewith a suitable diluent 5. The treated oil, from which a substantial quantity of N-bases and other basic contaminants have been removed, is discharged 6 from the cationic treater and supplied directly to a catalytic cracking system or may be run to a further purification treatment as will be hereinafter described.

The contaminated resin containing exchangeably held or chemisorbed N-bases (RH.B) is discharged from the cationic treater and is subjected to a flushing operation 7 such as with light hydrocarbon oils to remove adhering or absorbed oil therefrom. The resulting liquid mixture is separated 8 for instance by distillation or other available means of fractionation, the recovered purified oil being added 9 to the main body of oil discharged from the treater, while the flushing agent is recycled 10 for further use in the process.

The resin, after the described flushing treatment, is conveyed to a regenerator 11 where it is treated with acid 12 also preferably in a counter-current operation, the resin that is being discharged from the regenerator contacting the freshest acid. The thus regenerated resin is thereafter washed 13 and returned 14 to a hopper or other means supplying regenerated resin for further use in the cationic treater.

In the regenerating reaction between the acid and the base-containing resin salts, of the acid are formed in accordance with the following typical equation:

$$RH.B + H.A \rightarrow RH + HBA$$

The salts are discharged 15 from the regenerator and are decomposed 16 to restore the acid which is separated from the N-bases 17, the acid being discharged or recycled 18 for further use in regeneration, preferably after suitable fortification by addition of fresh acid, and the N-bases may be collected after further purification 19 for recovery of these valuable compounds. With salts decomposable at low temperature, as in the case of quinoline formate, the decomposition and separation is readily effected in a single operation as by fractional distillation.

In addition to deleterious N-bases the crude oil may also contain acidic type contaminats such as mercapto or other sulfur compounds. Certain of these impurities may therefore be picked up by an anionic exchange resin such as an amino resin. Accordingly, if desired, the purified oil from the cationic purification treatment may be further subjected to a process as illustrated in Figure 2. The oil is brought into an anionic treater 20 wherein it is contacted with such resin supplied from a suitable source 21, as a continuous counter-current operation, with the recovery of the thus purified oil 22 which may be sent directly to a catalytic cracking system or to storage.

The contaminated resin from the anionic treater may be flushed to remove adhering or adsorbed oil 23, 24, 25 in the same manner as previously described for the acidic resin (Figure 1) and the recovered oil 26 run into the main body of oil discharged from the treater. The resin, after being thus flushed, is subjected to regeneration 27 by reaction with a strong base 28 forming salts of the base and water which may be discharged to waste, or if desired treated for recovery of the base. The regenerated resin leaving the regenerator may be washed with water 30 and is then returned to the supply hopper 31 for further use in the process.

The principal nitrogenous bases found in petroleum oils which are deleterious in catalytic cracking are believed to have a structural characteristic of quinoline and pyridine homologues. Compounds of this type can be successfully removed by flowing oil by gravity over a base-exchange sulfonic acid resin in a packed column at room temperature employing 1 gram of resin per milli-equivalent of basic nitrogen compound contained in the oil. With a fixed bed of resin, for efficiency of operation, the flow of oil should be discontinued and the resin subjected to regeneration or reactivation when the nitrogen concentration of the resin reaches about 60-80% of theoretical capacity of the resin. In moving bed processes the flow rates of oil and resin may be adjusted so as to provide the contact time described for the fixed bed.

The resin may be employed in the form of coarse granules or shaped bodies such as beads or pellets. The use of resins in finely divided form is frequently to be found of definite advantage in that diffusion problems are thereby minimized.

The effect of water addition will be seen from the following control experiments:

*Example I*

(a) A solution of 2% by volume of quinoline in cetane was passed through a packed column containing granular commercial Zeo-Karb H (sulfonated coal) which had been dried at 105° C., the oil being first heated to 120° F. This resulted in the removal of about 20% of the quinoline.

(b) The procedure above was repeated with the addition of less than 1% water to the oil-quinoline mixture, in which case about 94% of the quinoline was removed.

Example II

2% by weight of quinoline in heavy white mineral oil (specific gravity 0.85) was run over a column of Amberlite IR-120 (sulfonated commercial phenolic resin) at 70° C. and at a rate of 2.4 volumes of oil per volume of resin per hour. The resin picked up 1.76 milliequivalents of nitrogen compounds per gram of resin.

The resin was regenerated by treating with twice the volume of 10% $H_2SO_4$ cycled over the resin three times using ten volumes of acid per volume of resin per hour, at 70° C. With this mild regeneration, the resin had a capacity of 60% of the original resin, indicating that more extensive acid treatment may be required for better regeneration.

Example III (a) A Los Angeles Basin gas oil (0.22% N) was treated with the resin of the preceding example at 70° C. and at a rate of 2.2 volume of oil per volume of resin per hour. The initial effluent constituting the first half of the oil run contained about 0.176% N, amounting to a removal of about 20% of the original N content.

(b) The run was repeated employing 10 volumes of oil per volume of resin, at a rate of 0.5 liter of oil per liter of resin per hour. About 23% by weight of the nitrogen content of the oil was removed.

It will be appreciated that the portion of the nitrogenous content of the oil more readily removed by the resin is that which, if not removed, would be present in most available form to interfere with the catalytic cracking reaction. Accordingly, with the removal of even less than half, as up to about 15 to 25%, of the nitrogen content of the oil considerable improvement in the crackability of most nitrogenous stocks should result.

In certain instances the nitrogen is contained in the oil in non-basic form but on heating of the oil these compounds are converted to basic form. For the removal of nitrogenous compounds therefrom such oils should be first heated to a temperature at which the transformation takes place, and the oil then subjected to removal of the converted basic nitrogen compounds, preferably after sufficient cooling to condense the oil if it is vaporized in the process.

Obviously many modifications and variations of the invention as hereinbefore set forth may be made without departing from the spirit and scope thereof and therefore only such limitations should be imposed as are indicated in the appended claims.

I claim as my invention:

1. In the process of purifying oils for use as charge to catalytic cracking, said oils containing basic nitrogenous contaminants, the step which comprises subjecting such an oil in liquid phase to contact in the presence of water with an organic base-exchange resin, and separating the thus contacted oil from the resin.

2. The process in accordance with claim 1 wherein said organic base exchange resin contains a free substituent from the group consisting of sulfonic and carboxylic acids and their alkali metal salts.

3. The process in accordance with claim 1 including the step of regenerating the used resin by treatment with acid.

4. The process of enhancing the crackability of a hydrocarbon charge stock, which comprises the step of pre-treating such a stock by contact in the presence of water with a sulfonated resin, and separating the thus treated stock from the resin.

5. The process of purifying oils to be catalytically cracked, said oils containing contaminants deleterious to cracking catalysts, which comprises: contacting such an oil in liquid phase with an acidic resin containing water in quantity sufficient to preserve the porosity of the resin, whereby basic contaminants in said oil are chemically bound by said resin and thereby removed from the oil, separating the oil from the resin, and further contacting the separated oil with an amino resin to remove acidic contaminants present in the oil.

6. The process of removing basic nitrogenous compounds from oils containing the same as contaminants therein, which comprises contacting such an oil in liquid phase with a sulfonated resin in the presence of water, thereby chemically combining basic nitrogenous compounds in said oil with said resin, separating the thus contacted oil and said resin, reacting the separated resin with a short chain aliphatic carboxylic acid thereby forming salts of the basic nitrogenous compounds while freeing the sulfonated resin for repeated use in contacting further quantities of such oil, heating the thus formed salts of the basic nitrogenous compounds to decompose the said salts and restore the original aliphatic carboxylic acid thereby freeing the basic nitrogenous compounds.

7. In the process of catalytically cracking petroleum fractions derived from crude oils containing basic nitrogenous contaminants deleterious in the catalytic cracking of such oils, the improvement which comprises subjecting an oil containing such nitrogenous contaminants to contact with acidic base exchange resin in the presence of water, to remove nitrogenous contaminants from the oil prior to contact of the oil with cracking catalyst.

GEORGE ALEXANDER MILLS.

REFERENCES CITED

The following references are of record in the file of this patent:

UNITED STATES PATENTS

| Number | Name | Date |
| --- | --- | --- |
| 1,671,721 | Ihrig | May 29, 1928 |
| 1,686,136 | Ihrig | Oct. 2, 1928 |
| 2,280,237 | Jones | Apr. 21, 1942 |
| 2,291,419 | Strickland | July 28, 1942 |
| 2,341,329 | Myers | Feb. 8, 1944 |
| 2,352,236 | Thomas | June 27, 1944 |
| 2,367,803 | Schindler | Jan. 23, 1945 |
| 2,375,694 | Schutze | May 8, 1945 |
| 2,384,315 | Kuhl | Sept. 4, 1945 |
| 2,429,666 | Block | Oct. 28, 1947 |
| 2,440,669 | Thurston | Apr. 27, 1948 |

FOREIGN PATENTS

| Number | Country | Date |
| --- | --- | --- |
| 805,092 | France | Aug. 17, 1936 |

OTHER REFERENCES

Myers; Ind. and Eng. Chem., vol. 35, pp. 858-863 (1943).

Applezweig et al., Ind. and Eng. Chem., vol. 38, pp. 576-579 (1946).